July 27, 1937.  W. M. CHARMAN  2,088,288
SLAB HOT TOP
Filed July 21, 1933  3 Sheets-Sheet 1

INVENTOR
WALTER M. CHARMAN

ATTORNEYS

July 27, 1937.  W. M. CHARMAN  2,088,288
SLAB HOT TOP
Filed July 21, 1933  3 Sheets-Sheet 2

INVENTOR
WALTER M. CHARMAN
Kwis Hudson & Kent
ATTORNEYS

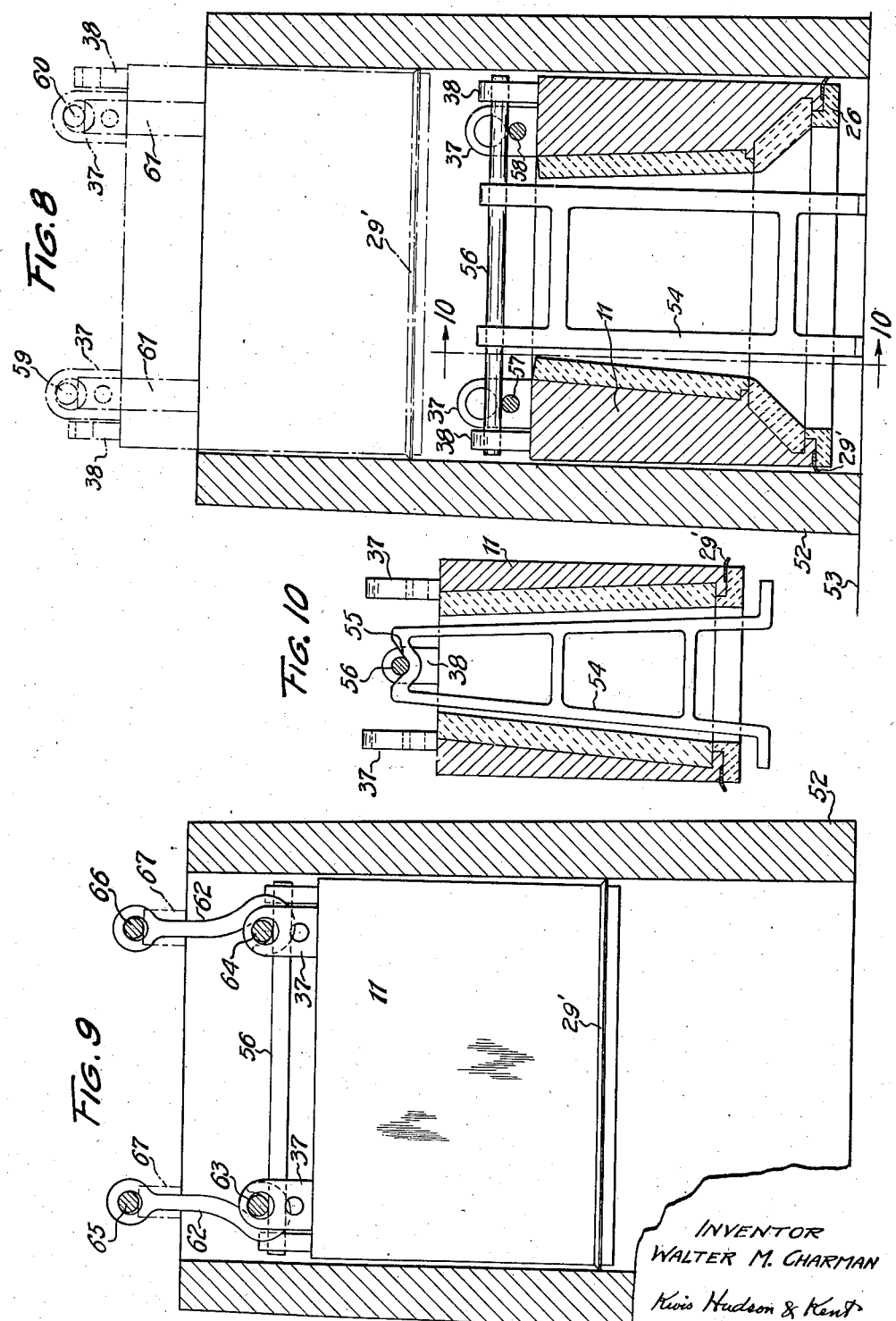

Patented July 27, 1937

2,088,288

UNITED STATES PATENT OFFICE 2,088,288

SLAB HOT TOP

Walter M. Charman, Cleveland Heights, Ohio

Application July 21, 1933, Serial No. 681,541

6 Claims. (Cl. 22—147)

This invention relates to improvements in slab hot tops, that is hot tops for use in connection with slab ingot molds.

One of the objects of the invention is the provision of a hot top for slab ingot molds so constructed as to sharply constrict the hot topped metal at the ends thereof while at the same time maintaining a substantially even taper throughout the upper portion of the hot topped metal, and more especially the provision of means for accomplishing these results in connection with a base for the hot top of approximately equal width throughout its extent.

Another object is the provision of a casing certain surfaces of which have a plurality of tapers in the up and down direction, together with means for mounting lining elements on such surfaces.

Another object is the provision of a novel method of assembling or mounting a hot top in or upon a big-end-down mold, where the hot top is equipped with wiper strips.

Still another object is the provision of a special form of removable trunnions.

A further object is the provision of removable and renewable socket members for spring clips employed to secure bottom lining elements to the casing.

Other objects and features of novelty will appear as I proceed with the description of those embodiments of the invention which, for the purposes of the present application, I have illustrated in the accompanying drawings, in which Figure 1 is a side elevation, partly in longitudinal vertical section, of a slab hot top embodying the invention.

Fig. 8 is a vertical sectional view of a big-end-down mold and of a hot top positioned therein, illustrating a method which I employ for assembling in this type of mold a hot top equipped with wiper strips.

Fig. 9 is a similar view showing the hot top suspended from the mold entirely within the walls of the mold, and Fig. 10 is a cross sectional view taken substantially on the line 10—10 of Fig. 8.

Figure 2:
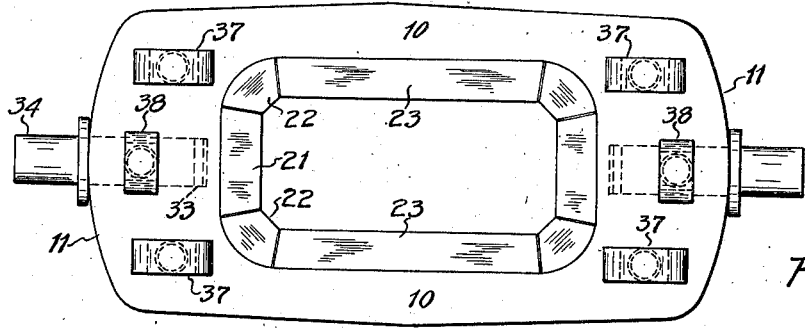
Fig. 2 is a top plan view of the same.
Figure 1:
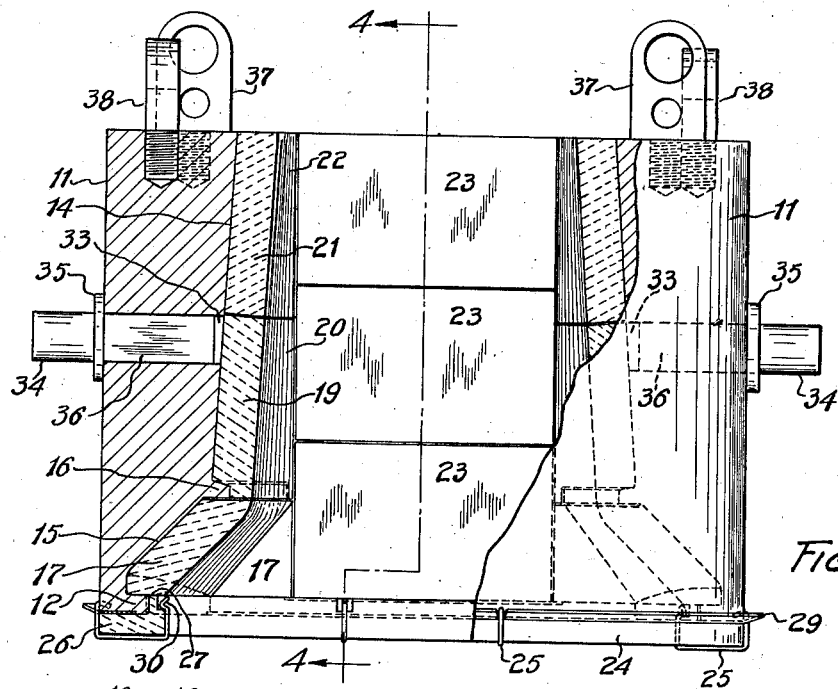

The casing illustrated in the drawings is preferably an iron casting, and as shown in Figs. 1 to 4 inclusive comprises side walls 10 and end walls 11. The hot top is of the type which is adapted to extend down into the mold and to float upon the ingot when poured, the perimeter of the hot top casing having the same contour as the inner wall of the mold, but being of such size as to afford a small clearance all around. Running around the bottom of the casing there is an internal ledge 12, which is preferably of approximately the same width throughout its extent.

The outer surfaces of walls 10 and 11 are preferably vertical, as shown. The inner surfaces of the side walls 10 however incline or taper upwardly toward each other, as illustrated at 13 in Fig. 4. The walls 11 at the ends are formed with internal tapers of at least two different inclinations or angles with the vertical, and the end walls, except at the bottom, may be quite thick. In the construction illustrated there are two such end tapers 14 and 15, the upper taper 14 corresponding substantially with the taper 13 on the side walls, while the lower taper 15 makes a considerable angle with the vertical. The tapers 14 and 15 meet at an intermediate ledge 16, which extends inwardly from each end wall of the casing. The middle portion of this ledge is spaced both vertically and horizontally from the ledge 12, although at its ends the ledge 16 curves into the same vertical planes approximately with the side portions of ledge 12. See the dotted line disclosure of Fig. 3.

Figure 3:
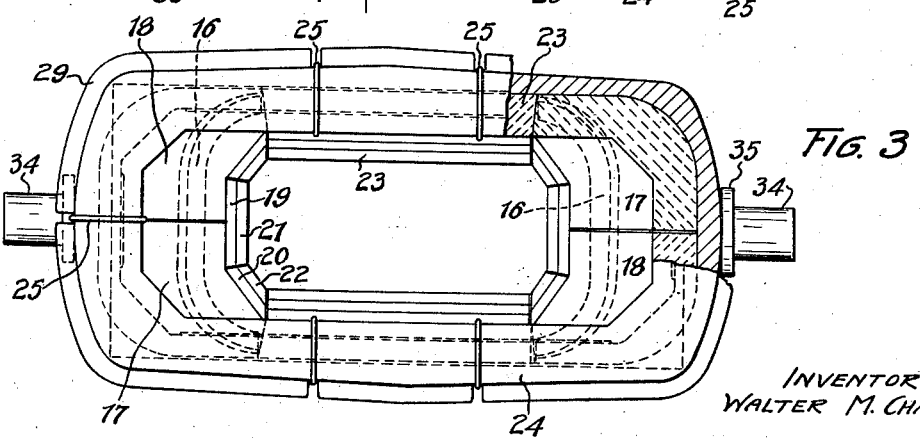
Fig. 3 is a bottom plan view, with certain parts shown in horizontal section.
Figure 4:
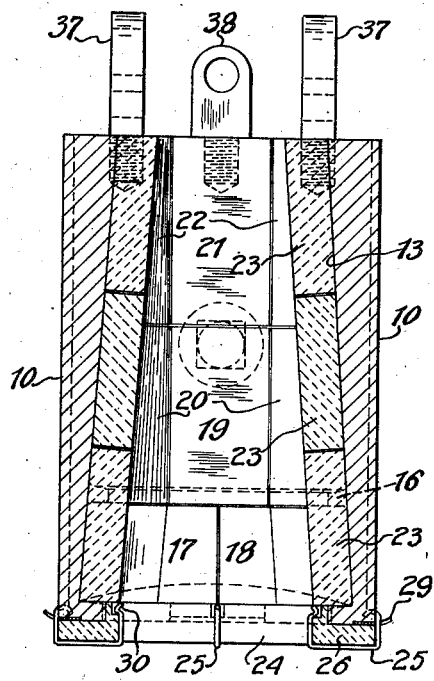
Fig. 4 is a vertical cross sectional view taken substantially on the line 4—4 of Fig. 1.

The ledge 12 supports at each end of the casing a plurality, preferably two, of preformed lining blocks 17 and 18 which fit the inner walls of the casing, rest upon the ledge 12, and engage beneath or just clear the ledges 16. The outer side edges of both blocks 17 and 18 are preferably beveled off, as indicated in Fig. 3.

Above the ledges 16 and supported thereby are blocks 19 and 20, preferably provided with downwardly extending lips overhanging the ledges 16 and substantially meeting the upper edges of blocks 17 and 18 so as to protect the ledges. Above the blocks 18 and 20 are additional blocks 21 and 22. The blocks 19 and 21 are identical in size and form, while the blocks 22 are smaller than the blocks 20, the blocks 20 and 22 being tapered toward their upper ends. It will be understood, of course, that a greater or lesser number of lining blocks may be employed to cover the end portion of the casing, but it will generally be desirable to employ more than one course above the ledge 16 because of the inconvenience and practical difficulties presented by the manufacture of large size lining blocks.

The sides of the casing are lined with blocks 23, which have parallel sides like the blocks 19 and 21, and are beveled on their side edges in the same way as are the blocks 19 and 21.

When all of the blocks 17 and 18 are in position the operator may slide the two lower blocks 23 downwardly into position. All of these blocks are then locked against falling inwardly, because of the beveled edges. Other forms of interfitting edges could be employed, but the beveled edges are preferred because of their simplicity. The operator next places the corner blocks 20 at one end of the casing in position, supporting them upon the ledge 16, after which he slides the block 19 down between them, thereby locking these three end blocks against inward movement, the lower side blocks 23 being longer than the blocks 17 and 18 so that they project upwardly well beyond the bases of the blocks 19 and therefore constitute abutments on the side towards the middle of the hot top. The operator then proceeds in the same way to place in position the blocks 19 and 20 at the opposite end of the casing, after which the second course of side blocks 23 are slid downwardly into place. These second course blocks 23 project upwardly far enough beyond the blocks 19 and 20 to constitute temporary abutments for the placing of the two sets of end blocks 21 and 22 the same way that the lower blocks acted to temporarily hold the end blocks 19 and 20. Slipping the upper course blocks 23 into position then completes the assembly, except for such cementing of the joints as may be necessary, and except for the mounting of the bottom ring or other covering for the lower ledge 12.

As a lining for the lower ledge 12 I prefer to employ a single bottom ring 24 of refractory material of the character disclosed in application for U. S. Patent Serial No. 595,579, filed by Philip R. Ward and myself on February 27, 1932, and to hold this ring in position by spring clips 25 of the character disclosed in application Serial No. 592,886 filed February 15, 1932. This ring comprises a flat horizontal portion 26 covering the lower surface of the ledge 12 and an upwardly extending flange 27 covering the inner side of the ledge. The latter is preferably recessed at 28 to receive a sheet metal wiper strip 29, see particularly Fig. 7.

Figure 7:
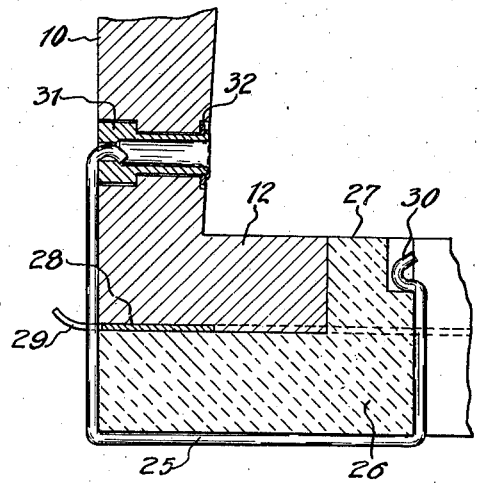
Fig. 7 is a vertical sectional view on a larger scale showing the lower end of a casing with a bottom ring or other lining element thereon, together with means for securing the bottom ring or other lining element in place.

One end of the clip 25 rests in a shouldered cavity 30 formed in the flange 27 of the ring. The other end of the clip is sprung into an opening in the casing just above the ledge 12. A feature of the present invention consists in the provision of a renewable socket member 31, which is hollow to receive the end of the clip and is provided with a head, as shown in Fig. 7, to abut against a shoulder formed in the perforation made in the casing to receive the socket member. At the inner side of the casing there is a shallow countersink within which rests a washer 32 over which the end of the hollow socket member is rolled or peened, whereby the socket member is fixed in place. This fastening is covered normally by the lining of the hot top, so that there is no danger of its becoming loosened accidentally. When the socket member becomes worn to such an extent that it does not readily hold the end of a clip it may be removed and a new one inserted. If this is done whenever the upper lining of the hot top is replaced, the socket members will always be in good condition.

In the thick portions of the casing at the ends thereof, I form aligned openings 33 which are preferably of square or other non-circular cross section, and may extend entirely through the casing walls. Trunnions 34 are removably mounted in these openings. They have outer portions of circular cross section, collars 35 to limit the movement of the trunnions into the casing and inner portions 36 of the same cross sectional size and shape, approximately, as the openings 33. The openings 33 are located in a vertical plane of symmetry of the casing and at the same level approximately as the center of gravity of the casing or of the complete hot top. Hence the hot top, when mounted upon the trunnions, may be turned over for inspection or repair with very little effort. It is sometimes desirable to lower a hot top of this character into a mold farther than the ordinary trunnions will permit, and this may be accomplished by the removal of my trunnions 34.

For convenience in handling I mount two sets of threaded posts 37 and one set of threaded posts 38 in threaded openings in the top of the casing, the thickness of the end walls of the casing making it readily possible to do this. These posts are all provided with holes into which lifting bars, hooks, or other handling means may be inserted, the holes of each pair of posts being arranged in alignment so that they may receive lifting bars if desired.

Figure 5:
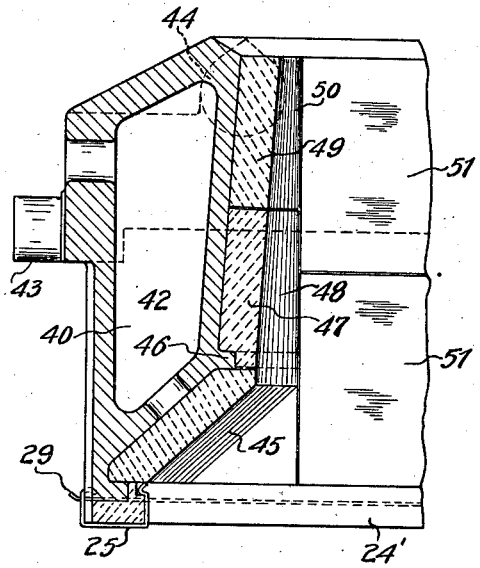
Fig. 5 is a fragmental longitudinal central sectional view of a modified form of the invention.
Figure 6:
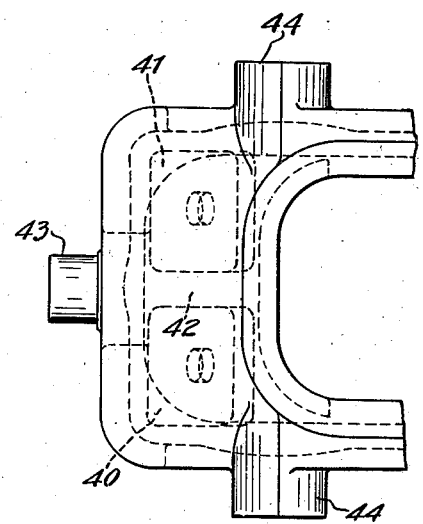
Fig. 6 is a fragmental top plan view of the casing only of Fig. 5.

In Figs. 5 and 6 I have illustrated a modified form of the invention wherein the end walls of the casing are cored out to provide cavities 40 and 41 separated by a web 42. In this instance on account of the absence of thick walls, I am not able to employ the removable trunnions and the threaded posts of the preferred form of the invention. Hence I have shown trunnions 43 cast integral with the end walls of the casing and lifting arms 44 also cast integral with the casing and protruding laterally therefrom. The lower lining blocks 45 are substantially identical with the blocks 17 and 18 of the first described form of the invention, while the upper lining blocks for the end of the hot top rest upon an intermediate ledge 46 similar to the ledge 16. The end blocks 47, 48, 49 and 50 are substantially the same as end blocks 19, 20, 21 and 22. On the sides of the casing however I have used in this instance but two courses of blocks 51, which are identical with the blocks 23 except as to dimensions. The bottom ring 24' is also similar to ring 24 of the first form.

When the hot top is to be employed in connection with a big-end-up mold, and lowered into the mold from above in the conventional manner, the wiper strips 29 are arranged as shown in Fig. 7. When it is desired to use the hot top with a big-end-down mold however, I mount the wiper strips 29' in a reversed position, that is with the outer portions thereof deflected downwardly, as shown in Figs. 8, 9 and 10, and proceed to raise the hot top from the bottom of the mold to pouring position instead of lowering it to that position from above in the conventional manner. My novel method of procedure is illustrated in Figs. 8, 9 and 10.

In these figures a big-end-down hot top is shown at 52, resting upon a floor surface indicated at 53. Upon the same floor surface I support a chair or horse 54 within the walls of the mold, this horse being formed at its upper end with spaced V-shaped sockets 55 adapted to receive a supporting bar 56 mounted in the aligned posts 38 at the ends of the hot top casing 11. The horse 54 is so made and proportioned that it can extend upwardly through the hot top to engage bar 56. The suspension of the hot top above the floor surface is desirable in order to relieve the refractory bottom ring 26, and the fastenings by which it is mounted, of the weight of the iron casing and the upper linings.

In carrying out this method of assembly, the hot top is first mounted upon the horse 54, as illustrated in Figs. 8 and 10, after which the mold 52 is lowered into position around the hot top, as indicated in Fig. 8. Crane hooks are then passed beneath the bars 57 and 58, mounted in the lower openings of posts 37, and the hot top is raised to whatever position may be desired, the wiper strips 29' wiping against the internal mold surfaces as the hot top ascends. Assuming that the dotted line position of the hot top in Fig. 8 is the predetermined pouring position, the raising of the hot top is interrupted at that level, the bar 56 is removed, and bars 59 and 60 are placed in the upper openings of the posts 37. These bars are longer than the bars 57 and 58 and overhang the side walls of the mold 52. Wooden or other blocks 61 are then inserted between the top of the mold and the ends of bars 59 and 60, after which the lifting hooks are disconnected and the weight of the hot top is supported upon the mold. The mold may then be lifted with a suitable crane to a height sufficient to clear the horse 54, after which the crane may be operated to transport the mold with its hot top attached thereto to the station at which it is to be located when the metal is poured.

When the metal is poured the wiper strip 29' prevents the flow of metal upwardly around the hot top in a manner well understood in the art. After the conclusion of the pouring operation the blocks 61 are knocked out or otherwise removed and the hot top floats upon the ingot in a manner also well understood in the art.

In Fig. 9 I have shown the hot top supported in a pouring position entirely within the walls of the mold 52, the difference in elevation of the hot top between this figure and Fig. 8 serving to indicate the wide variation in the size of the ingots which may be produced with a given set of apparatus. In this case the hot top is raised from its primary position at the bottom of the mold by means of hooks applied to the bar 56, or otherwise, after which hooks 62 are caused to engage bars 63 and 64 mounted in the upper openings of posts 37, these hooks having eyes at their upper extremities through which are threaded bars 65 and 66 that are long enough to overhang the walls of the mold. Wooden or other blocks 67 are then positioned between the bars 65 and 66 on the one hand and the upper end of the mold on the other hand, whereby the weight of the hot top is taken by the mold, and the latter with the hot top thus supported upon it may be raised and transported in the same manner as stated in connection with the description of Fig. 8. The lengths of the hooks 62 and the sizes of the blocks 67 may of course be varied in order to provide different pouring elevations for the hot top.

Variations from the described structure may be employed. Accordingly I desire it to be understood that the scope of the invention is to be regarded as defined exclusively by the appended claims, rather than by the foregoing description or the accompanying illustration.

Having thus described my invention, I claim:

1. In a hot top, a casing, two opposite internal surfaces of said casing being inclined inwardly and upwardly, and two remaining internal surfaces being each composed of two different inwardly and upwardly inclined parts, the lower part making a larger angle with the vertical than the upper part, and lining blocks fitted to and mounted upon all of said inclined surfaces.

2. In a casing for a hot top, a body member having inwardly and upwardly inclined internal side surfaces, and having internal end surfaces each composed of two different inwardly and upwardly inclined parts, the lower end part making a larger angle with the vertical than the upper end part, and means for supporting lining elements upon said casing.

3. In a slab hot top, a casing, an internal lower ledge extending around the casing, intermediate ledges extending inwardly from the opposite end portions only of the casing at a level above and spaced from said first named ledge, said upper ledges being spaced inwardly from said lower ledge at the ends of the casing, and the walls of the casing between said ledges being inclined at a greater angle to the vertical than the other internal surfaces of the casing.

4. In a slab hot top, a casing having a lower internal ledge on its side walls and having lower and upper internal ledges on its end walls, the end wall taper below the upper ledge making a greater angle with the vertical than the end wall taper above the upper ledge, upwardly tapered lining blocks supported upon the ledges at the ends of the casing, and side walls lining blocks with parallel side edges, said last named lining blocks being supported upon said lower ledge and having side edges interfitted with the adjacent side edges of the end lining blocks, whereby the side wall blocks act as keys to hold the lining in position.

5. In a hot top, a casing having inwardly and upwardly inclined inner surfaces, lining blocks for said casing in a plurality of courses, the blocks of each course comprising upwardly tapered blocks, and key blocks with parallel sides, certain of the key blocks of one of said courses overlapping in an up and down direction the tapered blocks of another course, whereby they assist in the placement of the blocks of the latter course during assembly.

6. In a hot top, a casing elongated in one horizontal direction, a ledge on each of the internal end walls of the casing spaced from the bottom thereof, said casing having different internal inwardly and upwardly inclined surfaces above and below said ledge, the upper surface making a smaller angle with the vertical than the lower surface, preformed rigid lining blocks supported upon said ledge, preformed rigid lining blocks fitted to the lower inclined surface and carried by the casing, and preformed rigid lining blocks fitted to and carried upon the internal side walls of the casing.

WALTER M. CHARMAN.